(No Model.)
T. N. PARKER.
STAKE FOR PLANTS, FLOWERS, OR TREES.
No. 551,000. Patented Dec. 10, 1895.
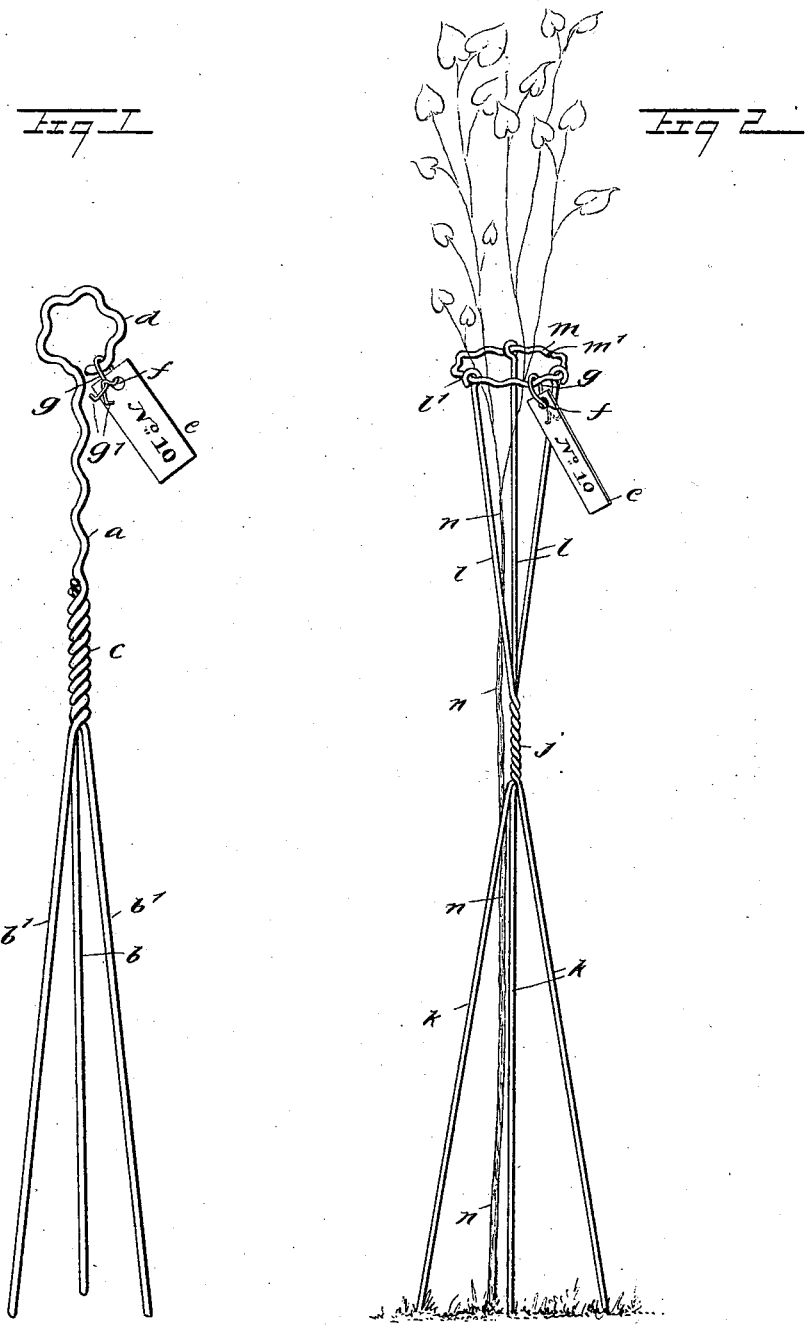
WITNESSES:
INVENTOR
ATTORNEYS.

UNITED STATES PATENT OFFICE.

THERON N. PARKER, OF QUICK, IOWA.

STAKE FOR PLANTS, FLOWERS, OR TREES.

SPECIFICATION forming part of Letters Patent No. 551,000, dated December 10, 1895.

Application filed February 18, 1895. Serial No. 538,743. (No model.)

*To all whom it may concern:*

Be it known that I, THERON N. PARKER, of Quick, in the county of Pottawattamie and State of Iowa, have invented certain new and useful Improvements in Stakes for Plants, Flowers, or Trees, of which the following is a full, clear, and exact description.

The invention relates to devices for supporting and tagging plants, trees, and the like, and the improvements are especially designed for the use of florists and nurserymen.

The invention consists in the novel features hereinafter particularly described, and defined in the claims.

Reference is to be had to the accompanying drawings, forming a part of this specification, in which similar letters of reference indicate corresponding parts in both the figures.

Figure 1 is a perspective view of a stake and tag embodying my invention, and Fig. 2 is a similar view illustrating a modification.

In practice the tags hereinafter described are given suitable numbers and the varieties of plants in each class are given different numbers, the numbers being recorded in a book giving the name of each plant tagged, so that the name of any plant bearing a particular number may be ascertained at once by a reference to the book under the class in which the plant belongs. In connection with the improved tags for this purpose I provide an improved stake for the plants, the stake serving to support the plant and carry the tag.

In the form shown in Fig. 1 the stake comprises a single shank $a$ and a plurality of legs $b\ b'$, of which, preferably, there are three. The stake is made of wire, and the legs are sufficiently flexible to be brought close together for shipping and storage, but may be readily bent to diverging positions to afford the necessary support for the stake when set in the ground. One leg—$b$, for instance—is continuous with the shank $a$, and the upper ends of the remaining legs $b'$ are twisted with the shank, as at $c$, this twisted form being given a sufficient length to form a permanent lock, such twisted part further forming a portion of the shank. Above the twisted portion of the shank the latter is crimped by suitable dies, the crimping being also continued around the eye or loop $d$, formed at the upper end of the shank. The crimping serves not only to ornament the shank, but it also gives added strength and is more readily discernible among the plants than an uncrimped shank. Thus the crimps and the twisted portion give the necessary strength to the shank, while the plurality of legs give the necessary stability below the shank.

The tag $e$ employed is of sheet metal and is formed with an eye $f$ at one end for receiving a metallic clasp $g$, which detachably holds the tag to the stake, and the tag, further, has a suitable number produced therein or thereon, which number corresponds to a number in a book giving the name of the plant under this number, a series of numbers being assigned to the varieties of each class, as hereinbefore stated.

The clasp is described in detail in my application filed concurrently herewith, Serial No. 538,744. By disengaging the interlocked ends $g'$ of the clasp $g$ the tag may be readily removed from the loop $d$.

In Fig. 2 the stake is formed of a plurality of wires, three being shown, and these wires are twisted together intermediate their ends, as at $j$. From the twist the wires diverge in two directions, forming at the lower end legs $k$ and at the upper end arms $l$, the wires being flexible to enable them to be given more or less divergence or to be brought into compact form for shipping or storage. It will be seen that the twist is at the upper end of the legs $k$—that is, the upper ends of the legs are twisted together—the same as in the construction illustrated by Fig. 1, and the arms $l$ form a support proper or shank corresponding to the shank $a$ in Fig. 1. The upper ends of the arms $l$ are bent to form eyes $l'$, which receive an open or split ring $m$, which may with advantage be crimped. This form also is designed for use with tags, as described.

Usually the nurseryman or other user will have a series of rings and stakes of different sizes, which he may use interchangeably, replacing the ring with a larger or a smaller one, as desired. This is effected by successively entering the eyes $l'$ between the separated ends $m'$ of the split ring $m$ and slipping them along such ring; also, this arrangement enables the ring to be removed for compactness in shipping. The ring $m$ may be made to encircle a plant $n$, as shown.

The twist gives strength to the stake and retains the several wires tightly bound together.

Having thus described my invention, I claim as new and desire to secure by Letters Patent—

1. A stake for plants, trees and the like, having a multiplicity of legs at its lower end, said legs being of wire and having their upper ends twisted together, substantially as described.

2. A metallic stake for plants, trees and the like, consisting of a shank and a plurality of legs, one of the legs being continuous with the shank, and the others being twisted thereto a distance from the upper end of the stake, substantially as described.

3. A metallic stake for plants, having a shank and a plurality of legs twisted into engagement with the shank, the shank being crimped above the twisted portion, substantially as described.

THERON N. PARKER.

Witnesses:
 JNO. M. RITTER,
 J. L. McAULIFFE.